UNITED STATES PATENT OFFICE.

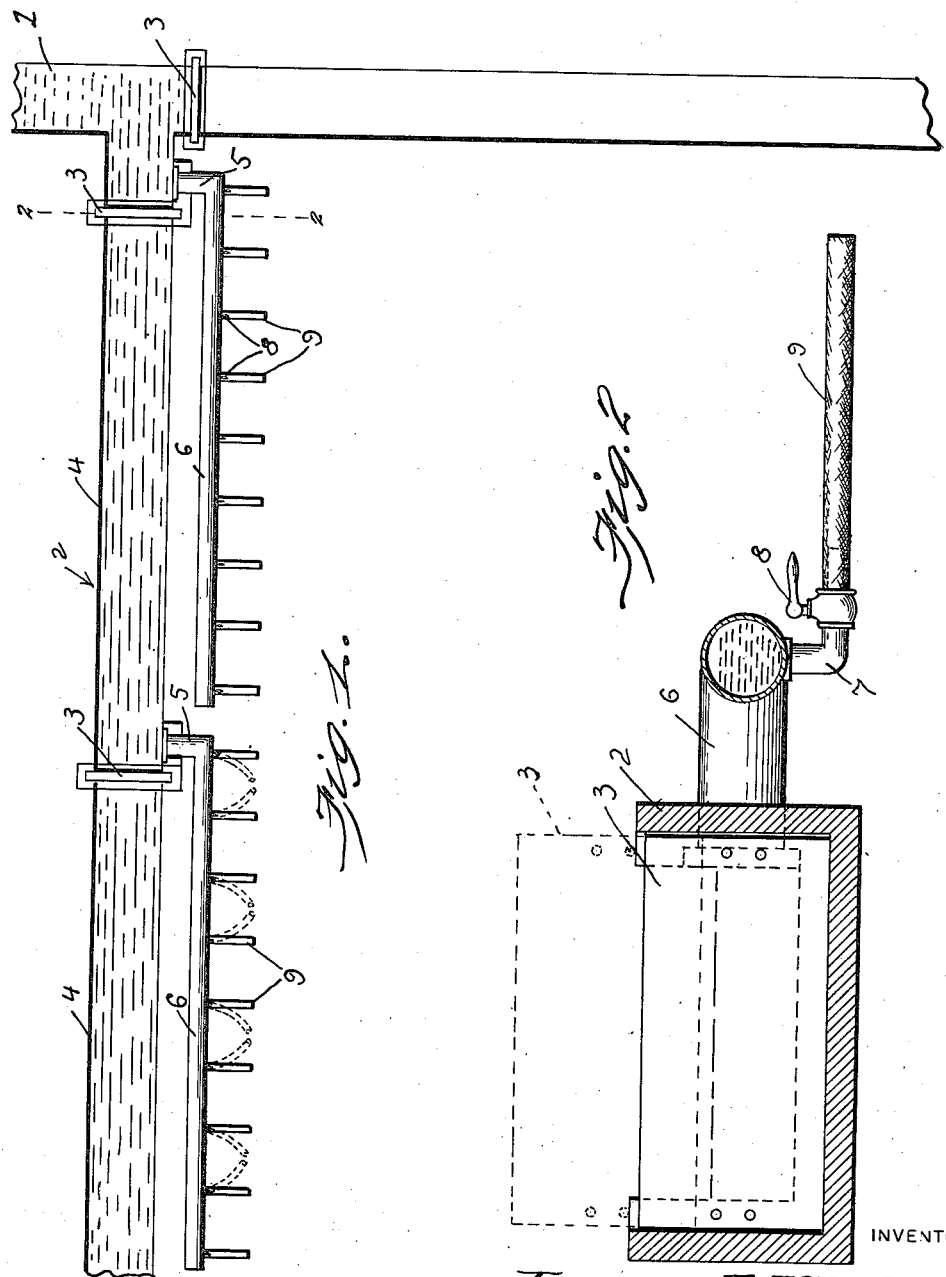

JAMES D. McNUTT, OF LEES SUMMIT, MISSOURI.

IRRIGATING SYSTEM.

1,277,332.  Specification of Letters Patent.  Patented Aug. 27, 1918.

Application filed October 25, 1917. Serial No. 198,411.

*To all whom it may concern:*

Be it known that I, JAMES D. McNUTT, a citizen of the United States, residing at Lees Summit, in the county of Jackson and State of Missouri, have invented certain new and useful Improvements in Irrigating Systems, of which the following is a specification.

This invention relates to irrigating systems.

The object of the invention is to so construct a system of this character which will thoroughly irrigate large areas of land in a simple and efficient manner and in which the water is always under the control of the operator.

Another object is to provide a system which may be constructed at a minimum expense and the distributing portions of which may be readily removed from place to place and installed with a minimum consumption of time and labor and which effect a great economy in the use of water.

Another object is to so construct a system of this class that the water used for irrigating will be distributed evenly to prevent some spots being left too wet and others too dry.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a plan view of a portion of the system constituting this invention, and Fig. 2 is a transverse vertical section taken on the line 2—2 of Fig. 1.

In the embodiment illustrated a main distributing pipe or feeder, not shown, supplies water to the system through a plurality of lateral pipes 1 and 2, the pipes 2, one of which is here shown being arranged at right angles to pipe 1. These pipes are suitably supported and the laterals 2 are provided at longitudinally spaced intervals with a plurality of gates or check valves 3 dividing the laterals into sections 4, each of which has an outlet pipe 5 leading from one side adjacent the gate 3 at the outlet end of the section. This pipe 5 has an extension 6 arranged at right angles thereto and positioned parallel with the lateral 4 in connection with which it is used.

A plurality of elbow-shaped longitudinally spaced couplings 7 depend from the bottom of each pipe 6 and are provided at their free ends with faucets 8 for controlling the passage of water through the couplings 7 to flexible hose sections 9 which are connected with said couplings. Any desired number of these hose sections 9 may be employed and they may be of any length desired, being shown arranged in parallel relation at the right of Fig. 1 so that the water passing therethrough is distributed in parallel planes. It need not necessarily be so distributed however, but two of the hose pipes 9 may be so positioned as to bring their discharge ends adjacent each other as shown in dotted lines at the left of Fig. 1 so that the water issuing from both of them will be discharged into a furrow or ditch designed to receive it, this arrangement being especially useful for irrigating corn and similar plants between which the furrows or ditches are rather deep and consequently will accommodate more water than rows of beans, beets and the like, such as are found in gardens, the arrangement at the right of Fig. 1 being especially designed for garden irrigation.

By using these rubber hose sections 9 with the faucets 8 at their inner ends, the amount of water to be run between each row may be regulated and the secret of successful irrigation is to keep the water under control and prevent its running wild and tearing up the crop, digging little ditches or furrows between the rows.

It will thus be seen that the pipes 5 and 6 may be readily removed and placed at different points along the lateral 4 and that by using the faucets, the water may be evenly distributed into all the rows, it not being necessary for the operator to remain on duty as the water will flow uniformly whether he be there or not.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. An irrigating system including a water supply pipe, check gates arranged at intervals therein, outlet pipes leading from said pipe near said gates, a plurality of longitudinally spaced elbow-shaped branch pipes leading from the bottom of said outlet pipe with their free arms disposed horizontally, and faucets arranged in said branch pipes.

2. An irrigating system including a water supply pipe, check gates arranged at intervals therein, outlet pipes leading from said pipe near said gates, a plurality of longitudinally spaced elbow-shaped branch pipes leading from the bottom of said outlet pipe with their free arms disposed horizontally, faucets arranged in said branch pipes, and flexible extensions carried by said branch pipes in advance of said faucets.

In testimony whereof I affix my signature in presence of two witnesses.

JAMES D. McNUTT.

Witnesses:
L. A. HESS,
HOMER MILLER.